US012750545B2

(12) United States Patent
Tashtarian et al.

(10) Patent No.: US 12,750,545 B2

(45) Date of Patent: Sep. 29, 2026

(54) ADAPTIVE BITRATE LADDER OPTIMIZATION FOR LIVE VIDEO STREAMING

(71) Applicant: Bitmovin GmbH, Klagenfurt am Wörthersee (AT)

(72) Inventors: Farzad Tashtarian, Klagenfurt am Wörthersee (AT); Christian Timmerer, Klagenfurt am Wörthersee (AT)

(73) Assignee: Bitmovin GmbH, Klagenfurt am Wörthersee (AT)

( * ) Notice: Subject to any disclaimer, the term of this patent is extended or adjusted under 35 U.S.C. 154(b) by 72 days.

(21) Appl. No.: 18/239,506

(22) Filed: Aug. 29, 2023

(65) Prior Publication Data

US 2025/0080787 A1 Mar. 6, 2025

(51) Int. Cl.

*H04N 21/2662* (2011.01)
*H04N 21/2187* (2011.01)
*H04N 21/24* (2011.01)

(52) U.S. Cl.

CPC ..... *H04N 21/2662* (2013.01); *H04N 21/2187* (2013.01); *H04N 21/2402* (2013.01)

(58) Field of Classification Search

CPC ........... H04N 21/2662; H04N 21/2187; H04N 21/2402; H04N 21/8456

See application file for complete search history.

(56) References Cited

U.S. PATENT DOCUMENTS

| | | | | |
|---|---|---|---|---|
| 7,472,178 | B2 * | 12/2008 | Lisiecki | H04L 67/1008 709/224 |
| 8,578,436 | B2 * | 11/2013 | Li | H04N 21/23418 375/240 |
| 9,420,050 | B1 * | 8/2016 | Sakata | G06F 9/46 |
| 9,747,592 | B2 * | 8/2017 | Lientz | G06Q 20/145 |
| 9,948,992 | B2 * | 4/2018 | Meng | H04N 21/4424 |
| 10,044,466 | B2 * | 8/2018 | Schmidt | H04L 43/0864 |
| 10,440,416 | B1 * | 10/2019 | Phillips | H04N 19/172 |
| 10,581,903 | B2 * | 3/2020 | Donahue | H04L 63/0236 |
| 10,587,523 | B2 * | 3/2020 | Mani | H04N 21/2335 |

(Continued)

OTHER PUBLICATIONS

European Application No. 20756353.7, Extended European Search Report mailed Nov. 3, 2021, 7 pages.

(Continued)

*Primary Examiner* — Philip P. Dang

(74) *Attorney, Agent, or Firm* — Marton Ribera Schumann & Chang LLP; Chien-Ju Alice Chuang

(57) ABSTRACT

Techniques for optimizing a bitrate ladder for live streaming are described herein. A method for optimizing a bitrate ladder for live streaming includes receiving client-side input and an origin-side input during a first interval in a timeslot, the client-side input comprising CDN logs, the origin-side input comprising a quality measure, extracting from the CDN logs frequency of requests for each bitrate in a bitrate ladder in the timeslot and the duration of recent stall events for client video players. During a second interval in the timeslot, an optimized bitrate ladder comprising an optimal set of bitrates (OSB) is selected using an optimization function, the optimization function taking as input quality measures and a coefficient value determined using stall information. The optimized bitrate ladder is sent to the origin server for live encoding follow-on segments.

20 Claims, 5 Drawing Sheets

(56) References Cited

U.S. PATENT DOCUMENTS

| | | | | |
|---|---|---|---|---|
| 10,592,578 | B1* | 3/2020 | Mokashi | H04N 21/25 |
| 10,841,177 | B2* | 11/2020 | Lipstone | H04L 41/0816 |
| 10,897,406 | B2* | 1/2021 | Yan | H04L 67/63 |
| 10,958,947 | B1* | 3/2021 | Wei | H04N 21/236 |
| 11,101,906 | B1* | 8/2021 | Jiang | H04H 20/12 |
| 11,157,948 | B2* | 10/2021 | Netter | G06Q 30/0277 |
| 11,303,532 | B2* | 4/2022 | Wang | H04L 67/10 |
| 11,425,432 | B2* | 8/2022 | Wallendael | H04N 19/147 |
| 11,431,562 | B2* | 8/2022 | Kerboeuf | H04L 41/5045 |
| 11,509,703 | B2* | 11/2022 | Chu | G06N 20/10 |
| 11,641,337 | B2* | 5/2023 | Flack | H04L 67/10 709/223 |
| 11,902,599 | B2* | 2/2024 | Dai | H04N 21/631 |
| 11,968,245 | B2* | 4/2024 | Aguilar-Armijo | H04L 65/756 |
| 12,028,530 | B2* | 7/2024 | Liu | H04N 19/196 |
| 12,032,545 | B1* | 7/2024 | Wilkinson | G06F 16/22 |
| 12,108,055 | B2* | 10/2024 | Amirpour | H04N 19/179 |
| 12,155,548 | B1* | 11/2024 | Karak | H04L 41/16 |
| 12,224,915 | B2* | 2/2025 | Casey | H04L 41/069 |
| 12,225,252 | B2* | 2/2025 | Liu | H04N 21/8456 |
| 2004/0205043 | A1* | 10/2004 | Alessi | H04L 63/101 |
| 2006/0188014 | A1* | 8/2006 | Civanlar | H04N 21/2365 375/240.03 |
| 2014/0075018 | A1* | 3/2014 | Maycotte | H04L 67/535 709/224 |
| 2016/0344751 | A1* | 11/2016 | Leach | H04L 67/535 |
| 2020/0258118 | A1* | 8/2020 | Kovvali | H04L 43/026 |
| 2021/0176530 | A1* | 6/2021 | Lobanov | H04N 21/6582 |
| 2021/0392202 | A1* | 12/2021 | Henning | H04L 67/63 |
| 2022/0141476 | A1* | 5/2022 | Erfanian | H04N 21/4348 348/384.1 |
| 2022/0150151 | A1* | 5/2022 | Ramamoorthy | G06Q 30/016 |
| 2023/0199255 | A1* | 6/2023 | Sanford | H04N 21/4627 725/25 |
| 2023/0283789 | A1* | 9/2023 | Shen | H04N 19/172 375/240.26 |
| 2024/0031629 | A1* | 1/2024 | Pejhan | H04N 21/23439 |
| 2024/0040171 | A1* | 2/2024 | Chen | H04N 21/23611 |
| 2024/0305788 | A1* | 9/2024 | Liu | H04N 19/146 |
| 2024/0346336 | A1* | 10/2024 | Fanfani | G06N 5/022 |
| 2024/0411977 | A1* | 12/2024 | Ho | G06F 30/392 |

OTHER PUBLICATIONS

Kurdoglu et al. "Real-Time Bandwidth Prediction and Rate Adaptation for Video Calls Over Cellular Networks," Proceedings of the 7th International Conference on Multimedia Systems, Jan. 1, 2016, 7 pp. 1-11.

Robitza et al., "A modular HTTP Adaptive Streaming QoE Model—Candidate for ITU-T P.1203 ("P.NATS")," 2017 Ninth International Conference on Quality of Multimedia Experience (QOMEX), May 31, 2017. pp. 1-6.

Zhang et al., "Deep Learning in Mobile and Wireless Networking: A Survey," arxiv.org, Cornell University Library, Mar. 12, 2018, pp. 1-67.

Kryftis et al., "Resource Usage Prediction Algorithms for Optimal Selection of Multimedia Content Delivery Methods," 2015 IEE International Conference on Communications (ICC), Jun. 8, 2015, pp. 5903-5909.

Abdelsalam et al., "Evaluation of DASH Algorithms on Dynamic Satellite-Enhanced Hybrid Networks," 2018 International Symposium on Advanced Electrical and Communication Technologies (ISAECT), Nov. 21, 2018, pp. 1-6.

125. MPEG Meeting, "WD of ISO/IEC 23000-19 2nd edition CMA," Motion Picture Expert Group or ISO/IEC, Jan. 22, 2019, pp. 1-150.

De Praeter et al., "Fast Simultaneous Video Encoder for Adaptive Streaming", 2015 IEEE 17th International Workshop, Oct. 19, 2015, pp. 1-6.

Kim Kyungah AL., "Fast CU Depth Decision for HEVC Using Neural Networks", IEEE Transactions on Circuits and Systems for Video Technology, vol. 29, No. 5, May 1, 2019, pp. 1462-1473.

International Application No. PCT/US2021/061678, International Search Report and Written Opinion mailed Mar. 3, 2022 9 pages.

Goswami Kalyan et al., "Adaptive Multi-Resolution Encoding for ABR Streaming", 2018 25th IEEE International Conference on Image Processing (ICIP), Oct. 7, 2018, pp. 1008-1012.

* cited by examiner

ADAPTIVE BITRATE LADDER OPTIMIZATION FOR LIVE VIDEO STREAMING

BACKGROUND OF INVENTION

Live video streaming over HTTP (e.g., HAS) has gained immense popularity in the last five years. Existing HAS solutions use a pre-defined set of bitrate-resolution pairs (referred to as a bitrate ladder), with a fixed number of pairs. This approach, while simple to implement, fails to deliver a pleasant quality of experience (QoE) in real-world streaming setups, which often involve variable network conditions, device capabilities, and content complexities. Consequently, optimizing the bitrate ladder by dynamically adjusting the number and values of bitrates and resolutions during the live session to improve QoE while minimizing resource consumption remains a challenging problem.

An optimized bitrate ladder depends on the type of content and the available bandwidth of clients. Therefore, some solutions have been developed to optimize bitrate ladders based on these factors. These solutions are broadly classified into content-based and context-based techniques. Content-based techniques involve analyzing video content or extracting relevant features to determine ideal encoding parameters. These features may include spatial and temporal complexity, motion activity, and color variance. Alternatively context-based techniques use network or client-related information to determine optimized bitrate ladders. These approaches take into account factors such as available network bandwidth and client device capabilities, including device display resolution and processing power. These techniques have shown good performance compared to fixed bitrate ladders. However, they largely depend on an offline phase and are primarily appropriate for video on-demand services, which makes their deployment for live streaming scenarios unfeasible.

Therefore, improved adaptive bitrate ladder optimization is desirable for live video streaming.

BRIEF SUMMARY

The present disclosure provides techniques for optimizing an adaptive bitrate ladder for live video streaming. A method for optimizing a bitrate ladder for live streaming, the method comprising: receiving a client-side input and an origin-side input during a first interval in a timeslot, the client-side input comprising a CDN log from a client, the origin-side input comprising a quality measure from an origin server; during the first interval, extracting from the CDN log a frequency of requests for each bitrate in a bitrate ladder in the timeslot and a duration of a recent stall event for the client's player; selecting, during a second interval in the timeslot, an optimized bitrate ladder comprising an optimal set of bitrates (OSB) using an optimization function, the optimization function taking as input the quality measure and a coefficient value determined using the frequency of requests and the duration of the recent stall event; and sending the optimized bitrate ladder to the origin server for live encoding a next segment.

In some examples, the method also may include selecting the coefficient value based on an average difference of quality and an average difference of bitrate. In some examples, the coefficient value is selected to decrease one or both of the average difference of quality and the average difference of bitrate. In some examples, the method also may include determining the coefficient value using a stall analysis function configured to determine the coefficient value and a binary variable based on a threshold mean stall duration. In some examples, the OSB comprises a new OSB when the binary variable comprises a True value. In some examples, the OSB comprises a previously selected OSB when the binary variable comprises a False value. In some examples, the CDN log comprises a URL of a HTTP request message, the duration of the recent stall event included in the URL in common media client data (CMCD) format. In some examples, the origin server comprises an origin agent and the quality measure comprises a measure of quality of a previously encoded segment by the origin server's live encoder. In some examples, the origin agent is deployed as a plug-in at the origin server and configured to measure perceptual quality. In some examples, the quality measure comprises one or both of a video multi-method assessment fusion (VMAF) and peak signal-to-noise ratio (PSNR). In some examples, the origin server comprises a live encoder configured to perform the live encoding of the next segment.

In some examples, the method also may include storing a tuple for each client that experienced a stall event, the tuple comprising a unique player identifier, a stall start time, and a stall end time. In some examples, the method also may include storing a number of requests received from a given client for each bitrate in a bitrate ladder. In some examples, selecting the optimized bitrate ladder comprises implementing a mixed-integer linear programming (MILP) model configured to perform a multi-objective optimization (MOO) function.

In some examples, the method also may include receiving a HTTP request from the client, the request comprising a selected segment and a requested bitrate; and providing the selected segment at the requested bitrate wherein the requested bitrate is included in the OSB or at a lower bitrate wherein the requested bitrate is not included in the OSB.

A distributed computing system may include: a distributed database configured to store client stall event information and bitrate ladders; and one or more processors configured to: receive a client-side input and an origin-side input during a first interval in a timeslot, the client-side input comprising a CDN log from a client, the origin-side input comprising a quality measure from an origin server; during the first interval, extract from the CDN log a frequency of requests for each bitrate in a bitrate ladder in the timeslot and a duration of a recent stall event for the client's player; select, during a second interval in the timeslot, an optimized bitrate ladder comprising an optimal set of bitrates (OSB) using an optimization function, the optimization function taking as input the quality measure and a coefficient value determined using the frequency of requests and the duration of the recent stall event; and send the optimized bitrate ladder to the origin server for live encoding a next segment. In some examples, the client stall event information is stored in tuples comprising a unique player identifier, a stall start time, and a stall end time.

A system for optimizing a bitrate ladder for live streaming, the system may include: a processor; and a memory comprising program instructions executable by the processor to cause the processor to implement: an analytics server configured to receive a client request comprising stall event information and an origin server message comprising a quality measure of a previously encoded segment, the analytics server further configured to select an optimal set of bitrates (OSB) using the stall event information and the quality measure; and an origin agent comprising a live encoder plug-in, the origin agent configured to measure perceptual quality of encoded segments and to request the encoder to adjust the bitrate ladder in accordance with the OSB selected by the analytics server. In some examples, the analytics server further is configured to implement a mixed-integer linear programming (MILP) model configured to perform a multi-objective optimization (MOO) function. In some examples, the MILP model is configured to receive as input a set of quality measures, a set of received requests for each bitrate in a bitrate ladder, and a coefficient value α.

Figure 1:
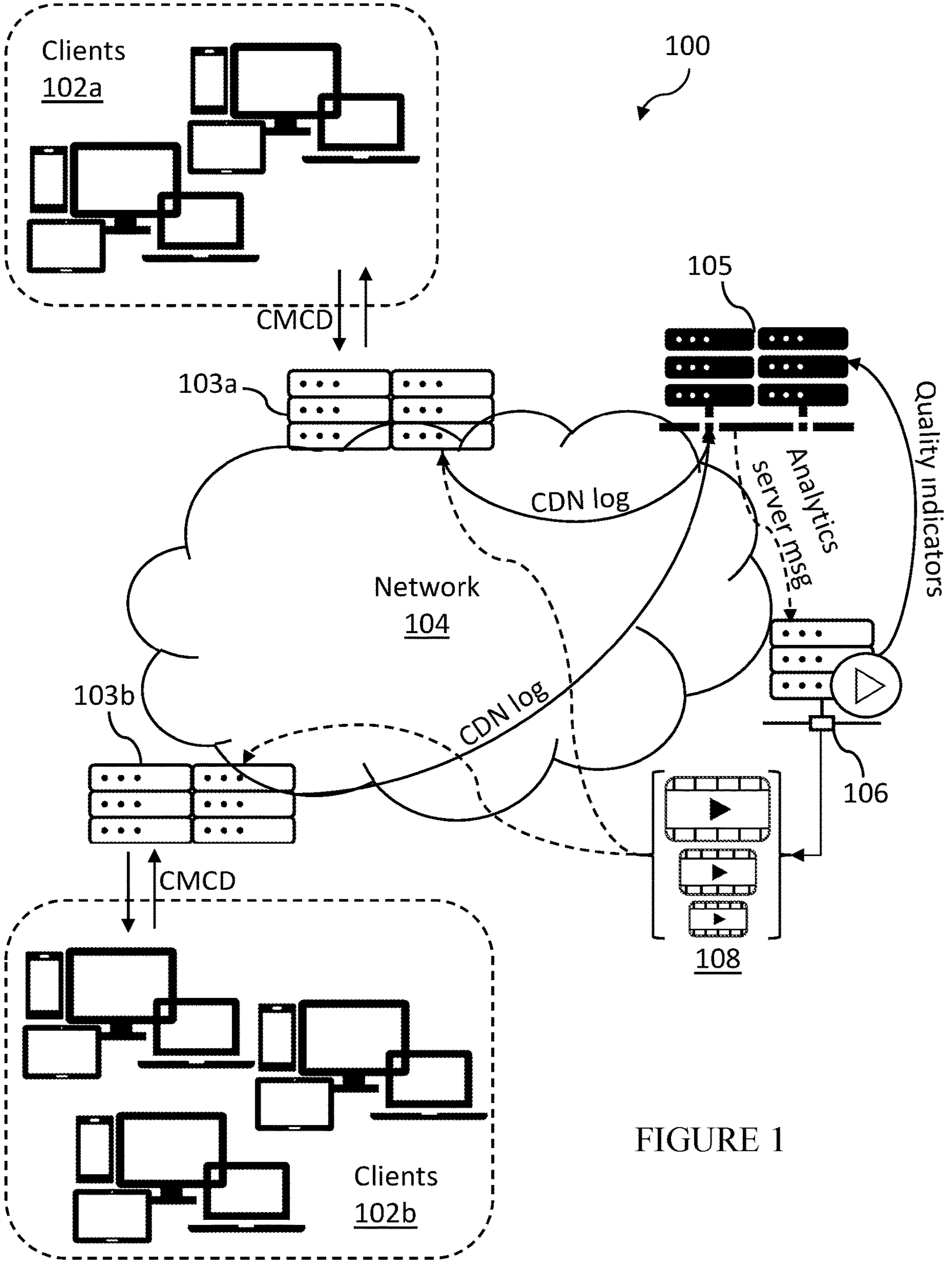
FIG. 1 is a simplified diagram illustrating an exemplary adaptive bitrate ladder optimization system, in accordance with one or more embodiments.

The figures depict various example embodiments of the present disclosure for purposes of illustration only. One of ordinary skill in the art will readily recognize from the following discussion that other example embodiments based on alternative structures and methods may be implemented without departing from the principles of this disclosure, and which are encompassed within the scope of this disclosure.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The above and other needs are met by the disclosed methods, a non-transitory computer-readable storage medium storing executable code, and systems for perceptually aware online per-title encoding.

In this invention, a bitrate ladder is optimized for live streaming services by utilizing information from the client and content delivery networks (CDNs) to improve quality of experience (QoE) and resource utilization within the delivery network. An end-to-end approach dynamically optimizes the bitrate ladder in live streaming applications leveraging real-time feedback from both origin and client sides. The invention comprises a highly scalable and plug-and-play solution (i.e., system) that seamlessly integrates with an existing HTTP adaptive streaming (HAS) solution. An end-to-end adaptive bitrate ladder optimization system, as described herein, can make the most out of both content-based and context-based bitrate ladder optimization techniques. Periodic real-time inputs may be received from a client (e.g., a video or media player and other devices configured to play videos and other media) and an origin server (e.g., an origin agent comprising or coupled with a live encoder) to dynamically select an optimized bitrate ladder comprising an optimal subset of bitrates (OSB) (i.e., an optimized temporary bitrate ladder) and to adjust the bitrate ladder accordingly during a live video session. This can result in a significant improvement in viewer QoE and reduction in encoding and delivery costs.

A system for optimizing a bitrate ladder may comprise an analytics server and an origin agent. The analytics server may determine an optimized bitrate ladder (e.g., periodically, responsively, per a schedule, on demand, ad hoc) based on inputs from various entities involved in the live streaming pipeline. The optimized bitrate ladder may comprise an OSB, as described herein). The origin agent may comprise a live encoder plugin configured to estimate a perceptual quality of every produced segment and request the encoder to adjust the bitrate ladder in accordance with an output (e.g., a decision) from the analytics server.

The analytics server may be located along a path between the client and the origin server. The analytics server may perform analytics and bitrate ladder optimization tasks (e.g., periodically, responsively, per a schedule, on demand, ad hoc). For example, during a live video session, the analytics server may collect client-side inputs (e.g., requested bitrate and stall duration) from each of a plurality of clients through a CDN and origin-side inputs (e.g., measured perceptual quality for each produced segment) from an origin server (e.g., a live encoder). The analytics server may use mixed-integer linear programming (MILP) to formulate a bitrate ladder optimization task as a multi-objective optimization problem. The result of said optimization comprises an optimized bitrate ladder (e.g., comprising OSB, as described herein), which may be provided to the origin server for a real-time encoding task.

The origin agent may be deployed as a plug-in at the origin server and configured to measure perceptual quality (e.g., in terms of video multi-method assessment fusion (VMAF), peak signal-to-noise ratio (PSNR), and the like). The origin agent may be further configured to communicate the perceptual quality measures to the analytics server (e.g., via in-band messages). Once the origin agent receives an updated bitrate ladder (i.e., an optimized bitrate ladder comprising OSB) from the analytics server, it may pass the updated bitrate ladder to an encoder (e.g., at the origin server) to for an encoding task.

In some examples, an origin server may comprise a commodity server that hosts a live encoder program to encode received content for a live camera into different bitrates-resolutions. The segments may be delivered into a distributed network (e.g., CDN). In some examples, a client may comprise a video or media playback device (e.g., player). The client may request (e.g., continuously, periodically, or otherwise) and buffer segments from a CDN network.

In some examples, the system for optimizing a bitrate ladder may operate in a timeslot manner, where each timeslot as a given duration of 0 seconds. Within each time slot, an analytics server may receive inputs from a CDN server (e.g., on behalf of a client) and an origin agent (e.g., on the origin side). Each timeslot may be divided into two or more intervals, comprising a collecting requests (CR) interval (i.e., first interval) and an optimizing bitrate ladder (OL) interval (i.e., second interval). During the CR interval, the analytics server may process metadata from CDN servers (e.g., CDN logs) to extract at least a frequency of requested different bitrates in the current timeslot and a duration of recent players' stall. For example, players may use Common Media Client Data (CMCD) to add stall information to a URL of a HTTP request message, thereby sending said stall information to a CDN server. A CDN server may transfer copies of relevant URLs to the analytics server. The origin agent may measure a quality of a plurality of produced segments by a live encoder and inform the analytics server accordingly. In this example, during the CR interval, the origin agent sends quality measures (e.g., PSNR, VMAF, and the like) of recently encoded video segments to the analytics server. The analytics server may use this information for updating the bitrate ladder. Moreover, the origin agent receives the recommended bitrate ladder from the analytics server and dictates it to a live encoder for encoding following live content (e.g., a next segment or plurality of segments). Any modifications made to the bitrate ladder are invisible to clients (e.g., players). A client receives a manifest, denoted by $\mathcal{M}$, that includes m different bitrates-resolutions (i.e., representations), which remain constant throughout a streaming session. A client may choose a representation from the manifest and send an HTTP request to buffer a subsequent segment. If the segment with the requested bitrate is present on the CDN server, the client may obtain it. Otherwise, the CDN server responds to the request by providing a segment encoded at a lower bitrate. In each OL interval, the analytics server may select an optimal subset of m bitrates (i.e., OSB), which may then be communicated to the origin agent. The live encoder may use the updated OSB to encode the live content.

Figure 3:
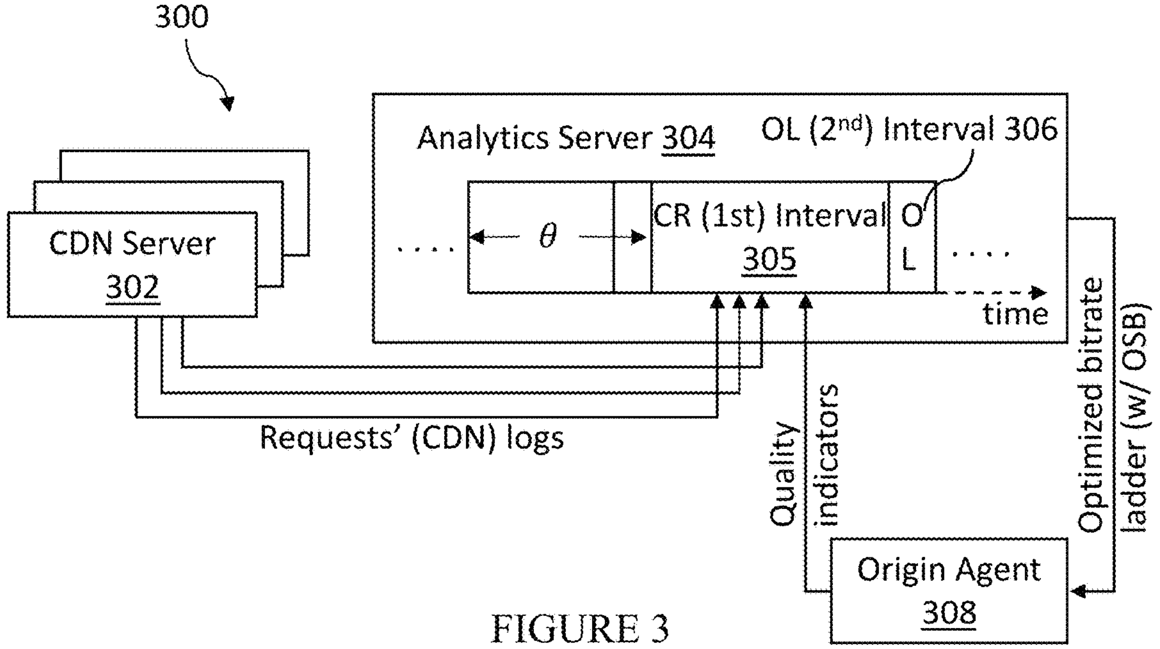
FIG. 3 is a simplified block diagram of an exemplary time slot allotment by an analytics server in an adaptive bitrate ladder optimization system, in accordance with one or more embodiments.

FIG. 3 is a simplified block diagram of an exemplary time slot allotment by an analytics server in an adaptive bitrate ladder optimization system, in accordance with one or more embodiments. In diagram 300, each timeslot comprises a given duration of 0 seconds (e.g., up to 10 seconds, or more or less). The duration of a timeslot may be selected so as to avoid a late reaction to network bandwidth fluctuation on a client side. In an example, a 10-second timeslot may comprise 5 segments, each of 2-second length, or another numbers of segments of a different length. In some examples, a timeslot may comprise collecting requests (CR) interval (i.e., first interval) 305 and optimizing bitrate ladder (OL) interval (i.e., second interval) 306. Analytics server 304 may collect requests from CDN server 302 during a CR interval 305 and may optimize a bitrate ladder during an OL interval 306. In some examples, CDN logs (e.g., metadata from a CDN server) may be processed and client-side input extracted during the CR interval 305. Also, during the CR interval 305, the origin-side input (e.g., quality measures) may be received from origin agent 308. In each OL interval 306, analytics server 304 may select an optimal subset of m bitrates (e.g., OSB). Analytics server 304 may send an optimized bitrate ladder comprising an OSB to origin agent 308 for use in live encoding following (i.e., next) segment(s) in a live streaming session. As described herein, the OSB may be determined during each OL interval using a MILP model.

In some examples, during each OL interval, an analytics server may determine an OSB for the offered representations in the manifest $\mathcal{M}$ and inform the origin agent accordingly. In an example, a mixed integer linear programming (MILP) model may be used to provide OSB in each OL interval. For example, $B=\{b_1, b_2, \ldots, b_m\}$ may comprise a set of m bitrates in the manifest $\mathcal{M}$ to which segments may be encoded where $b_m$ comprises a highest bitrate. A set $R=\{r_1, r_2, \ldots, r_m\}$ consisting of m non-negative integer elements may be defined, where $r_i$, $1 \le i \le m$, represents a number of requests for $b_i \in B$. For each $r_i$, a binary variable $x_i$ may be defined to indicate whether bitrate $b_i$ is included in the OSB ($x_i=1$) or not ($x_i=0$). However, if $b_i$ is not included in the OSB ($x_i=0$), and there are still requests for that bitrate (i.e., $r_i>0$), the analytics server may select a lower bitrate to serve those requests. In some examples, this may be handled by a set of (i−1) numbers of binary variables $Y_i=\{y_{(1,i)}, y_{(2,i)}, \ldots, y_{(i-1,i)}\}$ where $y_{(j,i)}=1$ shows $b_j$ will be transmitted to players requesting bitrate $b_i$. This results in the following constraints:

$$\sum_{j \in B \& j<i} y_{j,i} + x_i = 1, \forall_i \in B \tag{1}$$

$$\sum_{i \in B \& j<i} y_{j,i} \le x_j \times m, \forall_j \in B \tag{2}$$

The second constraint forces $x_j=1$ when bitrate $b_j$ is added to the OSB to serve players requesting bitrates greater than $b_j$. To prevent high bitrate changes, the number of chosen bitrates and differences between two consecutive OSBs may be limited to below thresholds $0<\ell \ll m$ and $\beta>0$, where $\ell$ represents a maximum length of OSB (e.g., 5, 6, etc.), and $\beta$ represents a maximum change between two successive OSBs. Therefore:

$$\sum_{i \in B} x_i \le l, \tag{3}$$

$$\sum_{i \in B} |x_i - \bar{x}_i| \le \beta, \tag{4}$$

where $\bar{x}_i \in \{0,1\}$ keeps the selected bitrate of the previous OSB. Since the analytics server collects quality measures of previously encoded segments in current and past timeslots, this information may be leveraged to accurately estimate a quality of upcoming segments. In some examples, an analytics server may employ a Linear regression technique to train function F using collected quality measures. Using function F, the average degradation in quality (e.g., PSNR or VMAF) may be measured. Using bitrates variables q and s, the following equations may be used to determine when a server request should be served with a lower bitrate:

$$\sum_{i \in B} \sum_{j \in B \& j<i} r_i \times y_{j,i} \times (F(b_i) - F(b_j)) \le q \times \sum_{i \in B} r_i, \tag{5}$$

$$\sum_{i \in B} \sum_{j \in B \& j<i} r_i \times y_{j,i} \times (b_i - b_j) \le s \times \sum_{i \in B} r_i, \tag{6}$$

where real variable $q \ge 0$ indicates the average difference of quality when bitrate $b_j$ is selected to serve all requests for bitrate $b_i$ (i.e., $y_{j,i}=1$) and real variable $s \ge 0$ indicates the average difference of bitrate when bitrate $b_j$ is selected to serve all requests for bitrate $b_i$ (i.e., $y_{j,i}=1$). With q and s, we can introduce the following multi-objective optimization (MOO) function:

$$MOO = \alpha \times \frac{q}{Q} - (1-\alpha) \times \frac{s}{S}, \quad (7)$$

where Q and S are used as upper-bounds of q and s for the normalization purpose, respectively. Coefficient α may be defined to prioritize q and s (e.g., to optimize reduction of or decreases in q and s). For example, by setting α=1, the analytics server may select a subset of bitrates from set B that minimizes the average quality degradation, thereby serving clients using the client-requested bitrates. In another example, by setting α=0, the analytics server may serve the requests with a lowest bitrate. The MILP model may be expressed as:

$$\text{Minimize } MOO \text{ (Eq. (7))} \quad (8)$$

$$\text{s.t. Eq. (2)} - \text{Eq. (6)} \quad (9)$$

$$\text{var. } x_i, y_{j,i} \in \{0, 1\}, q \geq 0, s \geq 0 \quad (10)$$

Figure 4A:
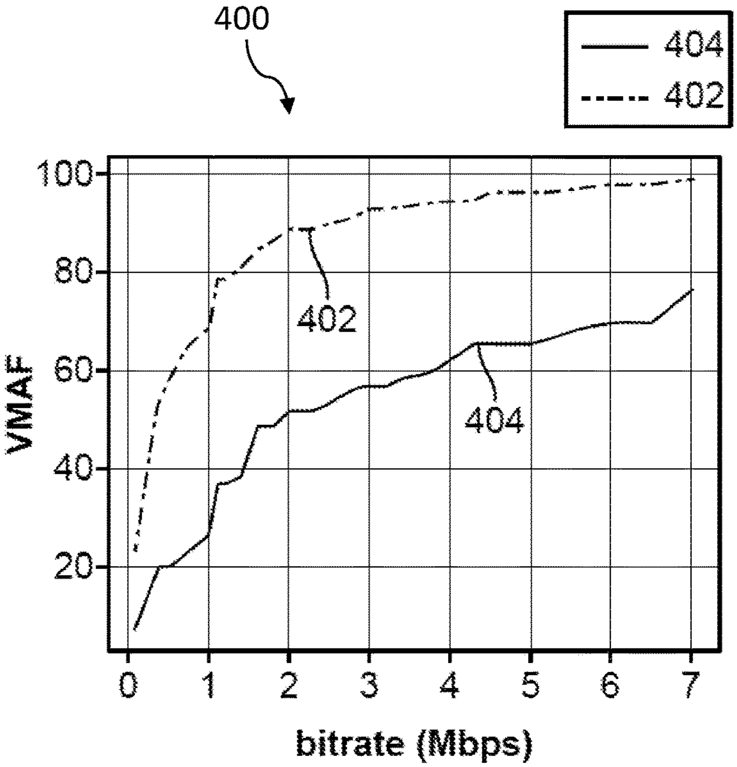
FIG. 4A is a chart illustrating exemplary rate-distortion (RD) curves for different types of content, in accordance with one or more embodiments.
Figure 4B:
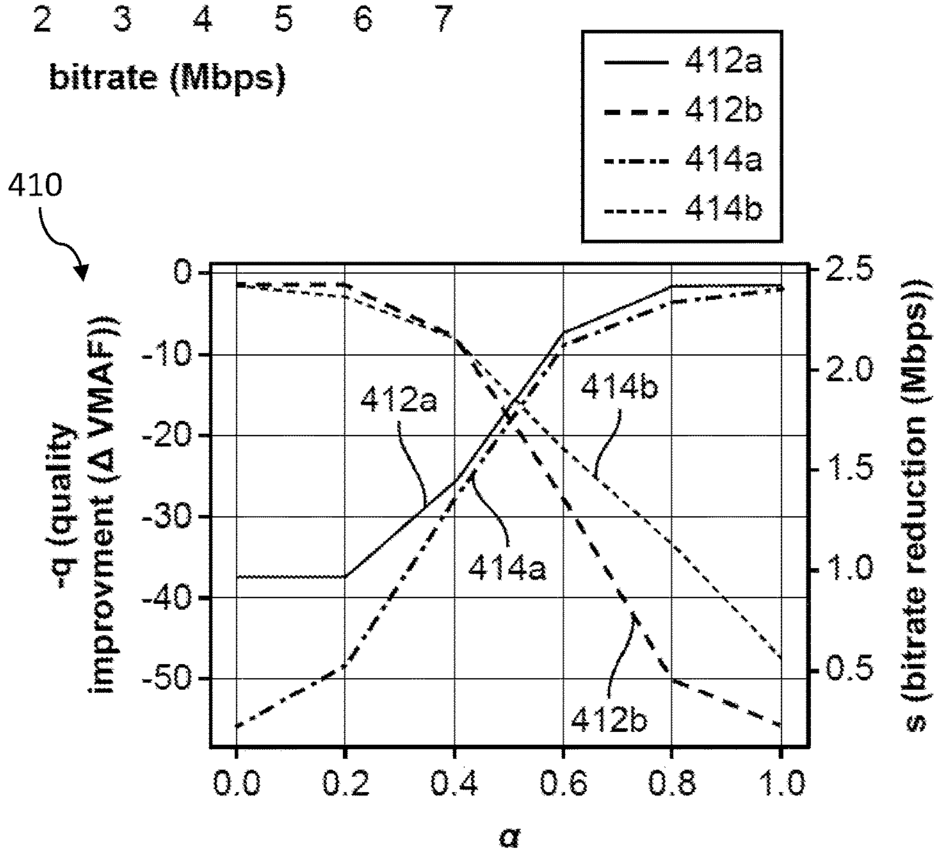
FIG. 4B is a chart illustrating exemplary measured quality improvements and bitrate reduction as a function of coefficient α, in accordance with one or more embodiments.

In FIG. 4A, chart 400 shows two different exemplary rate distortion (RD) curves for different types of content—RD curve 402 for one type of content and RD 404 for another type of content. The quality function F may determine a quality of each bitrate based on a given curve, such as RD curve 402 and/or RD curve 404. In some examples, other parameters may be set as follows: $\ell=\beta=8$, $x_i=0$, $\forall_i$, and for each bitrate $b_i$, $r_i$ may be set to a random value between 50 and 100 (e.g., for a heterogeneous system regarding clients' requested qualities). FIG. 4B is a chart illustrating exemplary measured quality improvements and bitrate reduction as a function of coefficient α, in accordance with one or more embodiments. Chart 410 in FIG. 4B shows the impact of different values of a on quality improvement, as denoted by −q (e.g., lines 412*a* and 414*a*), and bitrate reduction s (e.g., lines 412*b* and 414*b*). In chart 410, lines 412*a* and 412*b* indicate −q and s, respectively, for the same content as RD curve 402. In chart 410, lines 414*a* and 414*b* indicate −q and s, respectively, for the same content as RD curve 404. Setting α to zero, a MILP model may identify an OSB that results in a minimum quality improvement, which amounts to approximately q=37 and 55 for v1 and v2, respectively. At the same time, it also may achieve a maximum bitrate reduction of s≅2.4 Mbps. However, increasing the value of α may lead to the MILP model sending more data to clients, which reduces s. In turn, this may result in a significant quality improvement. For example, when α=1, the MILP model may select a subset of bitrates with an average of approximately 1% VMAF degradation regarding the VMAF of requested bitrates, while on average, 0.35 and 0.7 Mbps of bitrates are reduced for v1 and v2, respectively.

In some examples, the time complexity of the proposed MILP model is not affected by a number of clients and instead may be based on a number of bitrates in B. For example, if there are m bitrates in B, each bitrate $b_i$ has one binary variable $x_i$ and (i−1) number of variable $y_{j,i}$. The total number of variables is therefore $$m + \frac{m(m-1)}{2} + 2,$$

where two real variables q and s are included. The number of constraints is equal to 2m+4.

As shown in FIGS. 4A-4B, the value of a significantly affects both volume of traffic and quality of segments received by clients. This highlights the potential of a in enabling an analytics server to respond effectively to changes in client states by leveraging feedback from clients and origin servers, and also the importance of selecting an optimal value of α to balance the trade-off between reducing stall events and maintaining high video quality.

The following is an exemplary algorithm for an analytics server to determine an OSB:

Algorithm 1 ARTEMIS algorithm

```
1: for each timeslot do
2:    R ←[ ], T ←[ ], I ←[ ]                      ▷ CR interval starts
3:    while in CR interval do
4:       I ← CollectQualityIndicators( )
5:       T,R ← ProcessCDNlogs( )
6:    end while                                    ▷ OL interval starts
7:    α, T flag ←StallAnalysis(T)                          ▷ Alg. 2
8:    OSB,q ← Optimization(R,I,α)                          ▷ Alg. 3
9:    if T flag then
10:      SendOSBtoAOagent(OSB)
11:   else
12:      Qflag ←Quality Analysis(R,q,I)                    ▷ Alg. 4
13:      if Qflag then
14:         SendOSBtoAOagent(OSB)
15:      end if
16:   end if
17: end for
```

During each CR interval (i.e., lines 2-6 of Algorithm 1), an analytics server may collect quality measures of previously encoded segments as reported by an origin server, which may be saved in set I. In addition, the analytics server may process CDN servers' logs to extract stall information and a number of demands for each bitrate $b_i$ and store them in the following sets:

- Set T, which includes a list or tuple (cid, $t_s$, $t_e$) for each client that experienced a stall event. Here, cid may be a unique player identifier that every HTTP request may carry according to the CMCD specification and $t_s$ and $t_e$ indicate the start and end time of the stall event. If a player encounters a stall event during a streaming session, the client will send stall information along with the player's cid. However, if the analytics server does not receive any stall information for a client player during the CR interval, it adds (player's cid, 0,0) into the T array.
- Set $R=\{r_i|i=1, \ldots, m\}$, where $r_i$ represents a number of received requests for bitrate $b_i \in B$ (i.e., each bitrate in the bitrate ladder). When a client player experiences a stall event, its ABR may send a request to buffer all encoded segments reaching the edge of the live streaming. A limit may be set on the number of considered requests from each client player in constructing set R, which may be equal to a length (i.e., duration) of a timeslot (e.g., θ seconds) divided by a segment duration, an integer number of or approximating a segment length, or other integer. Set R may be updated in each CR interval.

In some examples, a main task during an OL interval is to generate an OSB using a proposed optimization model (e.g., the MOO in Eq. (8)). Inputs to an optimization model (e.g., MOO) may include (1) set I, (2) set R, and (3) a coefficient value α. Selecting an optimal value α may include calling a StallAnalysis( ) function to determine an appropriate value for α in line 7 of Algorithm 1 above. An exemplary StallAnalysis( ) function may be:

Algorithm 2 StallAnalysis Function

1: Input sets: StallHistory, StallAlpha
2: function STALLANALYSIS(Stall)
3: mstall ← mean(Stall)
4: α ← SelectAlpha(StallAlpha,mstall)
5: lastinstall ← StallHistory[end]
6: if lastmstall = = 0 then
7: $T_s \leftarrow \min(1, \text{mstall})$
8: else
9: $T_s \leftarrow \min\left(1, \frac{mstall - lastmstall}{lastmstall}\right)$
10: end if
11: StallHistory[end+1] ← mstall
12: flag ← False
13: if randomi( ) ≤ $T_s$ then
14: flag ← True
15: end if
16: return α, flag
17: end function A StallAnalysis( ) function may receive inputs, including a StallHistory set, which records an average duration of stalls in each timeslot, and a StallAlpha dictionary, which specifies an α value for each range of stall. A StallAlpha dictionary may be provided by a system administrator and can be updated during a streaming session. For example, if StallAlpha={[0,2]:1.0,[2,]:0.8}, then where an average stall duration falls in a range of [0,2] seconds, α may be set to 1.0, and where the average stall duration is greater than or equal to 2 seconds, α may be set to 0.8. In other examples, a StallAlpha parameter may be defined as {1: [0,1],0.9:[1,2], 0.8:[2,3],0.7:[3,4],0.6:[4,5],0.5:[5,100]}, in which case where an average stall duration falls between 0 and 1 in each time slot, the optimization mode will run with α=1, and so on. A value of α may be determined in line 4 of Algorithm 2 above. By having the mean of the stall, denoted by mstall, and the value of the mean stall in the last previous timeslot, denoted by lastmstall, the StallAnalysis( ) may adjust a threshold $T_s$ (e.g., Algorithm 2, lines 6-10) according to a difference between mstall and lastmstall. In line 12 of Algorithm 2, binary (e.g., Boolean) variable flag may be defined with an initial value False. Thereby, if stall events increase significantly, a generated random number in line 13 with a high probability is less than or equal to $T_s$. Consequently, if flag=True, a new OSB is required to prevent experiencing further stall events by client players. Algorithm 2 may return values of α and flag to Algorithm 1.

Returning to Algorithm 1, an optimization function may be called in line 8 with inputs R, I, and α. An exemplary optimization function may be:

Algorithm 3 Optimization Function

1: Input sets: OSBHistory
2: function OPTIMIZATION(R,I,α)
3: F ← EstimateQI(I)
4: OSB,q ←MILPmodel(α,R,F,OSBHistory[end])
5: OSBHistory[end+1] ← OSB
6: return OSB,q
7: end function In an optimization function, an OSBHistory set may be declared to store produced OSBs. In line 3 of the optimization function, an EstimateQI( ) function may be called with input parameter I to train an estimator function F (e.g., from Eq. (5)), for example, using a linear regression technique. After that, a MILP model (e.g., Eq. (8)) may be run with appropriate inputs to produce an OSB in line 4 of Algorithm 3. The OSB may be determined by selected values of $x_i$ variables. The value of q may be returned along with the OSB to Algorithm 1.

Returning to Algorithm 1 above, if the StallAnalysis( ) function returns a True flag (i.e., flag=True), an analytics server may use a simple RESTful API to notify a newly determined OSB to an origin agent. On the other hand, if the stall events are insignificant (i.e., flag=False), another metric may be considered to ensure that the last OSB remains unchanged by calling a QualityAnalysis( ) function at line 12 of Algorithm 1. An exemplary QualityAnalysis( ) function may be:

Algorithm 4 Quality Analysis algorithm

1: function QUALITYANALYSIS(R, q,I)
2: d ← [ ]
3: for r ∈ R do
4: d.append(DiffQuality(r.selectedBr,r.servedBr,I))
5: end for
6: q* ← mean(d)
7: if q = = 0 then
8: $T_q \leftarrow \min(1, q^*)$
9: else
10: $T_q \leftarrow \min\left(1, \frac{q^* - q}{q}\right)$
11: end if
12: if random( ) ≤ $T_q$ then
13: return True
14: end if
15: return False
16: end function In lines 3-5 of Algorithm 4, a difference between a quality of a requested bitrate and a quality of a served bitrate may be measured. The quality of served bitrates may be available from set I. Other bitrates may use function F (e.g., from Eq. (5)). If a mean of quality difference is high, client players may be requesting higher bitrates due to various conditions (e.g., high available bandwidth), while OSB is providing lower bitrates. In such case, threshold $T_q \leq 1$ may be adjusted according to the gap between obtained q by an optimization function (e.g., Algorithm 3) and the mean of quality difference stored in q* (i.e., lines 6-11 of Algorithm 4). If a generated random number is less than $T_q$ in line 13, the analytics server may send an obtained OSB to the origin agent in line 14. Otherwise, a live encoder may continue with a previous OSB.

FIG. 1 is a simplified diagram illustrating an exemplary adaptive bitrate ladder optimization system, in accordance with one or more embodiments. System 100 may comprise clients 102*a*-102*b*, CDN servers 103*a*-103*b*, network 104, analytics server 105, and origin agent 106. In some examples, network 104 may comprise a distributed network that includes one or more of CDN servers 103*a*-103*b*, analytics server 105, and origin agent 106. In some examples, clients 102*a*-102*b* may comprise one or more computers or other devices configured to play video and other media using a media player. As described herein, clients 102*a*-102*b* may communicate client-side inputs (e.g., requested bitrate, stall duration, client player characteristics, and the like) to CDN servers 103*a*-103*b*, respectively. CDN servers 103*a*-103*b*, in turn, may send CDN logs (e.g., including information relating to client-side inputs) to analytics server 105. In some examples, analytics server 105 may be configured to extract from CDN logs client-side inputs, including at least a frequency of requested different bitrates in a current timeslot and a duration of recent client players' stalls. Analytics server 105 also may receive origin-side inputs, including at least measured perceptual quality for each produced segment (e.g., quality measures) from origin server 106. Analytics server 105 may use the client-side inputs and origin-side inputs to determine an optimized bitrate ladder, as described herein, and to adjust the bitrate ladder accordingly during a live video session. Analytics server 105 may communicate an updated bitrate ladder (e.g., reflecting the optimized bitrate ladder) to origin agent 106 (e.g., using an analytics server message). Origin server 106 may use the updated bitrate ladder for encoding follow-on (i.e., next) segment(s) in the live content, thereby generating encoded segments 108. Origin server 106 may send encoded segments 108 to CDN servers 103*a*-103*b*.

Figure 2:
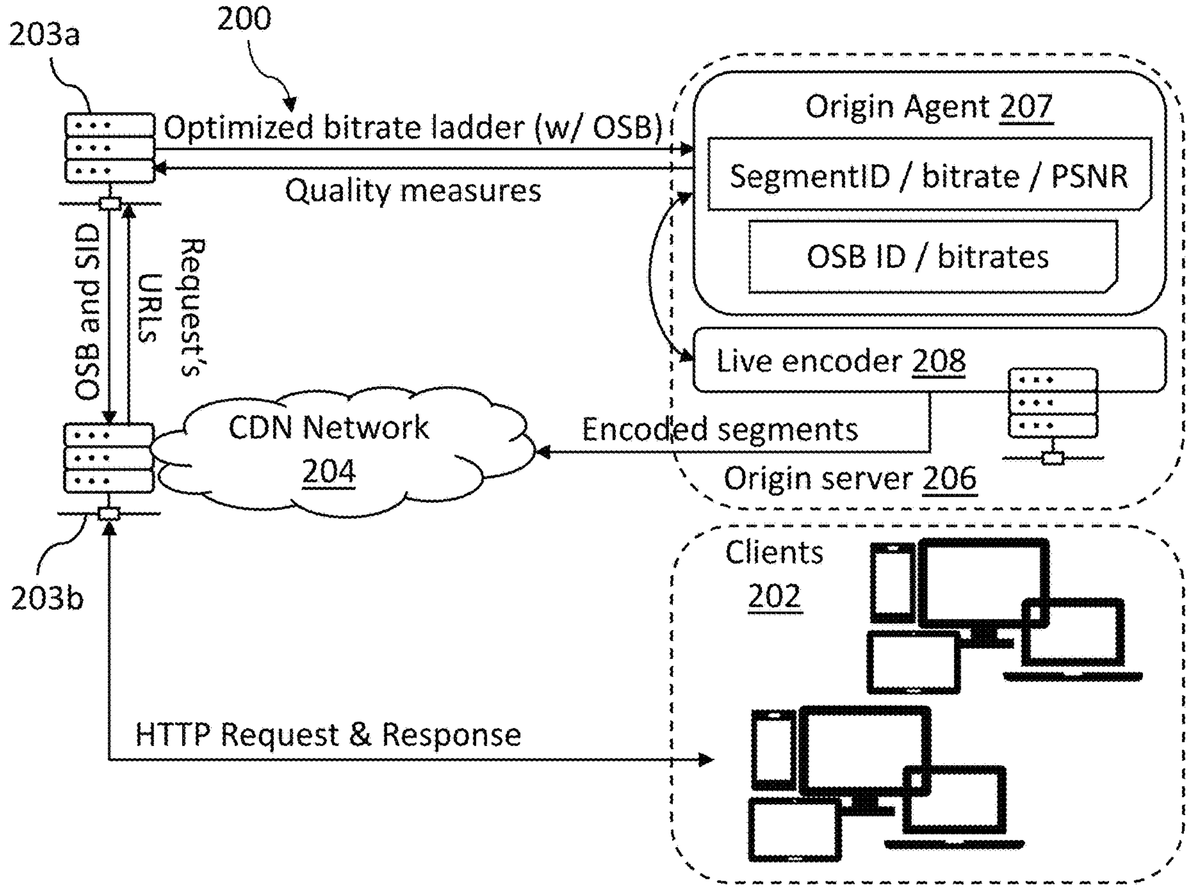
FIG. 2 is a simplified diagram illustrating an exemplary topology for an adaptive bitrate ladder optimization system, in accordance with one or more embodiments.

FIG. 2 is a simplified diagram illustrating an exemplary topology for an adaptive bitrate ladder optimization system, in accordance with one or more embodiments. Diagram 200 includes clients 202, servers 203*a*-203*b*, CDN network 204, and origin server 206. In some examples, server 203*a* may comprise an analytics server and server 203*b* may comprise a web server. Origin server 206 may comprise origin agent 207 and live encoder 208. In an example, clients 202 may comprise one or more devices configured to run a video player or other media player. In some examples, servers 203*a*-203*b* may be implemented using one or more virtual machines in a distributed (e.g., cloud) environment. Web server 203*b* may receive players requests from clients 202 and change representation ID in HTTP request URLs according to OSB updates. In this example, analytics server 203*a* may inform web server 203*b* of newly selected OSB and segment ID(s) (SID), indicating that the available bitrates of segments with SID greater than the SID on CDN Network 204. In this example, once the changes are applied based on the OSB and SID, web server 203*b* may send a modified request with a new URL to CDN network 204. Additionally, a copy of the new URL and original URL may be sent to analytics server 203*a*, for example, using a TCP socket.

Analytics server 203*a* may receive request's URLs from web server 203*b* and qualities of encoded segments from origin agent 207. Analytics server 203*a* may implement a timeslot and run an optimization model (e.g., Eq. (8) MOO) to determine an OSB. In this example, analytics server 203*a* may inform origin agent 207 and web server 203*b* of the OSB.

Origin agent 207 may send calculated quality measures (e.g., PSNR or VMAF values) to analytics server 203*a*. Origin agent 207 also may update encoder settings based on an OSB received from analytics server 203*a*. In some examples, during encoding, live encoder 208 may compute quality measure values and save a tuple of (segmentID, bitrate, quality-indicator-value) for each encoded segment in a log file. Origin agent 207 also may read the saved data from the log file and send it to analytics server 203*a*, for example, using a TCP socket. In addition, upon receiving an OSB from analytics server 203*a*, origin agent 207 may update a setting file by adding selected optimal subset of m bitrates and OSB ID to the setting file. Subsequently, live encoder 208 may encode follow-on (i.e., next) segment(s) based on a latest added OSB, for example, by adjusting arguments of an ffmpeg's arguments.

FIG. 3 is a simplified block diagram of an exemplary time slot allotment by an analytics server in an adaptive bitrate ladder optimization system, in accordance with one or more embodiments. In diagram 300, each timeslot comprises a given duration of θ seconds (e.g., up to 10 seconds, or more or less). The duration of a timeslot may be selected so as to avoid a late reaction to network bandwidth fluctuation on a client side. In an example, a 10-second timeslot may comprise 5 segments, each of 2-second length, or another numbers of segments of a different length. In some examples, a timeslot may comprise collecting requests (CR) interval 305 and optimizing bitrate ladder (OL) interval 306. Analytics server 304 may collect requests from CDN server 302 during a CR interval 305 and may optimize a bitrate ladder during an OL interval 306. In some examples, CDN logs (e.g., metadata from a CDN server) may be processed and client-side input extracted during the CR interval 305. Also, during the CR interval 305, the origin-side input (e.g., quality measures) may be received from origin agent 308. In each OL interval 306, analytics server 304 may select an optimal subset of m bitrates (e.g., OSB). Analytics server 304 may send an optimized bitrate ladder comprising an OSB to origin agent 308 for use in live encoding following (i.e., next) segment(s) in a live streaming session. As described herein, the OSB may be determined during each OL interval using a MILP model.

Figure 5:
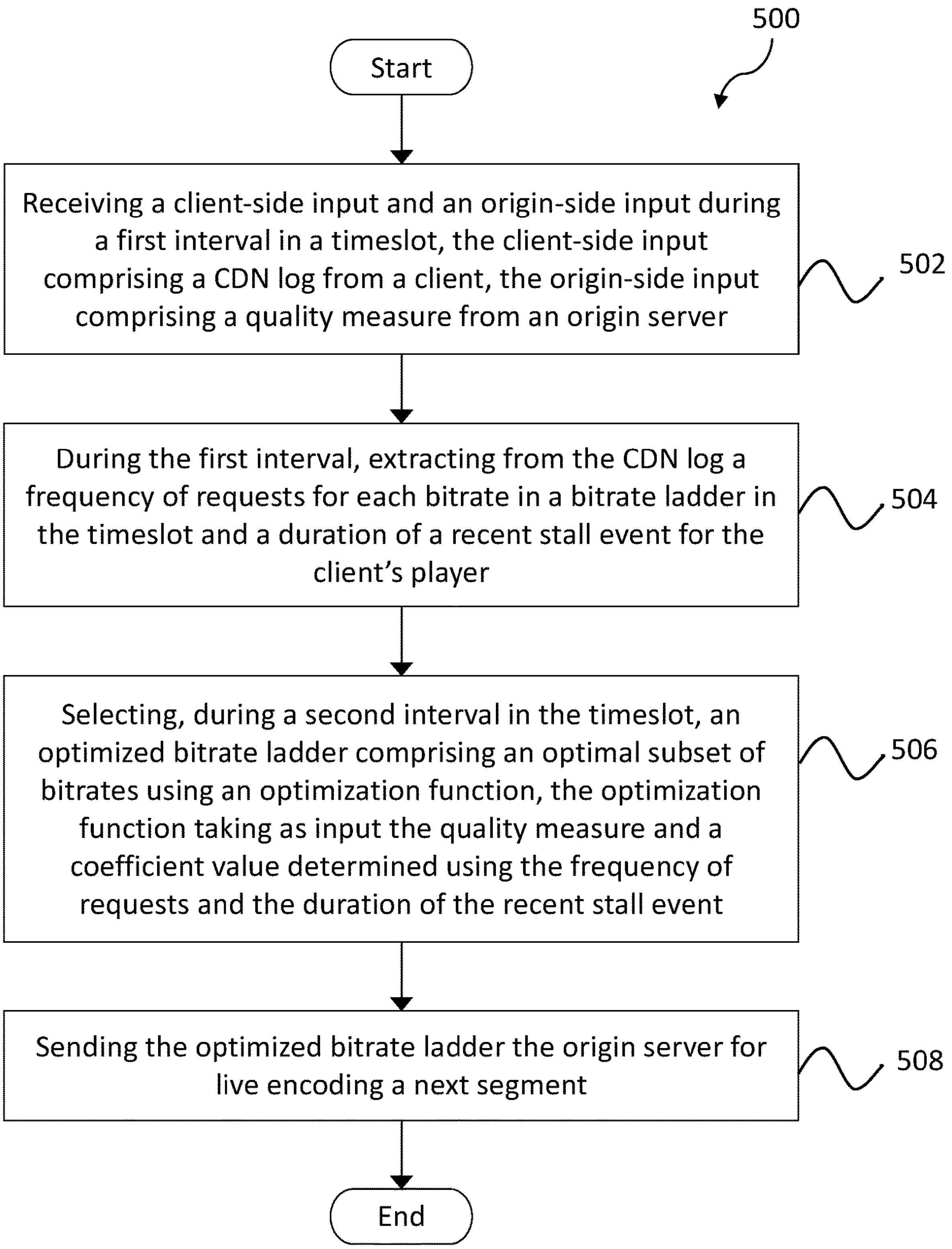
FIG. 5 is a flow chart illustrating an exemplary method for adaptive bitrate ladder optimization, in accordance with one or more embodiments.

FIG. 5 is a flow chart illustrating an exemplary method for adaptive bitrate ladder optimization, in accordance with one or more embodiments. Method 500 begins with receiving a client-side input and an origin-side input during a first interval in a timeslot at step 502, the client-side input comprising a CDN log from a client, the origin-side input comprising a quality measure from the origin server. In some examples, the quality measure may comprise measures of perceived quality for previously encoded segments. In some examples, the CDN log may comprise one or more URLs of HTTP request messages, which may include the duration of one or more recent stall events (e.g., in CMCD format). During the first interval, at step 504, a frequency of requests for each bitrate in a bitrate ladder in the timeslot and a duration of a recent stall event for the client's player may be extracted from the CDN log. During a second interval in the timeslot, an optimized bitrate ladder comprising an optimal subset of bitrates (OSB) may be selected using an optimization function at step 506. The optimization function may take as input the quality measure and a coefficient value (e.g., α) determined using the frequency of requests and the duration of the recent stall event. The optimized bitrate ladder may be sent to the origin server for live encoding a next segment at step 508. In some examples, the origin agent may comprise a live encoder plugin configured to estimate a perceptual quality of every produced segment. In some examples, the origin agent also may request an encoder to adjust the bitrate ladder for live encoding further segments in accordance with the output (e.g., a decision) from the analytics server, which may include a new optimized bitrate ladder (e.g., comprising a new OSB) or an instruction to continue encoding using a previous bitrate ladder (e.g., comprising a previously selected OSB).

Figure 6A:
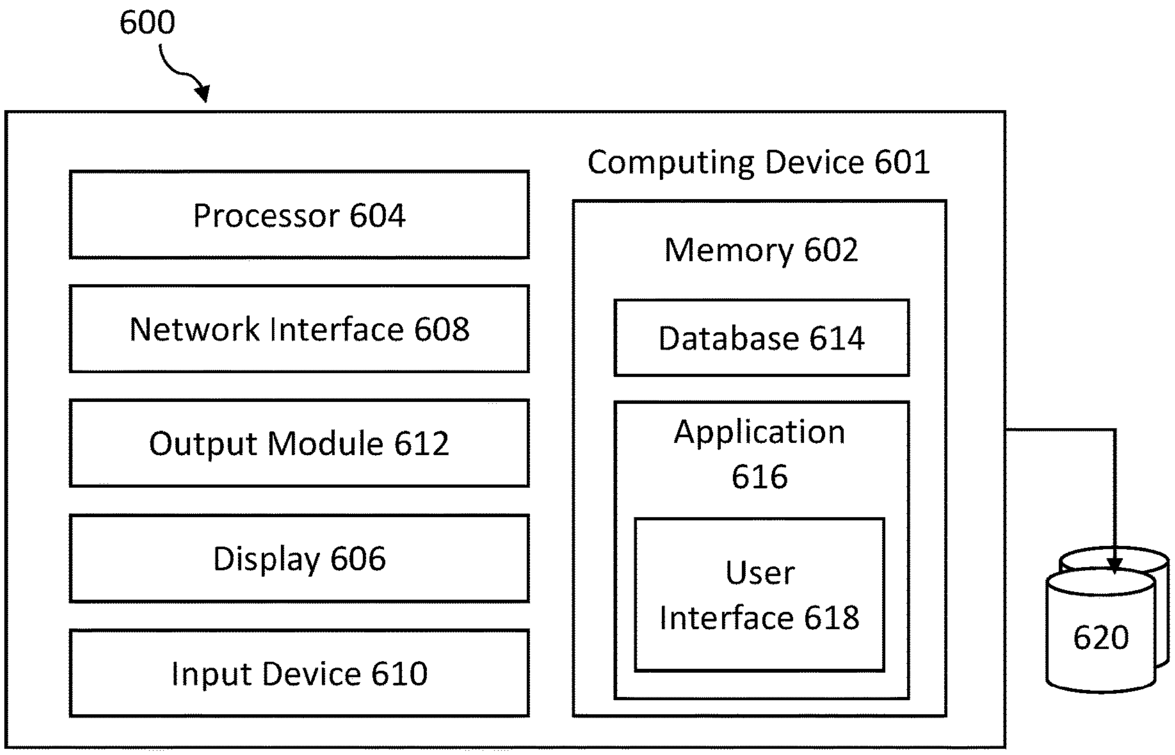
FIG. 6A is a simplified block diagram of an exemplary computing system configured to implement the systems and topologies illustrated in FIGS. 1-3 and perform steps of the method illustrated in FIG. 5, in accordance with one or more embodiments.

FIG. 6A is a simplified block diagram of an exemplary computing system configured to implement the systems and topologies illustrated in FIGS. 1-3 and perform steps of the method illustrated in FIG. 5, in accordance with one or more embodiments. In one embodiment, computing system 600 may include computing device 601 and storage system 620. Storage system6520 may comprise a plurality of repositories and/or other forms of data storage, and it also may be in communication with computing device 601. In another embodiment, storage system 620, which may comprise a plurality of repositories, may be housed in one or more of computing device 601. In some examples, storage system 620 may store networks, video data, bitrate ladders, bitrate-resolution pairs, target encoding sets, metadata, instructions, programs, and other various types of information as described herein. This information may be retrieved or otherwise accessed by one or more computing devices, such as computing device 601, in order to perform some or all of the features described herein. Storage system 620 may comprise any type of computer storage, such as a hard drive, memory card, ROM, RAM, DVD, CD-ROM, write-capable, and read-only memories. In addition, storage system 620 may include a distributed storage system where data is stored on a plurality of different storage devices, which may be physically located at the same or different geographic locations (e.g., in a distributed computing system such as system 650 in FIG. 6B). Storage system 620 may be networked to computing device 601 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 601, which in some examples may be included in mobile device 601 and in other examples may be included in a server (e.g., dual-processor server), also may include a memory 602. Memory 602 may comprise a storage system configured to store a database 614 and an application 616. Application 616 may include instructions which, when executed by a processor 604, cause computing device 601 to perform various steps and/or functions (e.g., implementing algorithms described herein and other aspects of optimizing an adaptive bitrate ladder), as described herein. Application 616 further includes instructions for generating a user interface 618 (e.g., graphical user interface (GUI)). Database 614 may store various algorithms and/or data, including networks and data relating to bitrates, client information, videos, video segments, bitrate-resolution pairs, target encoding sets, device characteristics, network performance, among other types of data. Memory 602 may include any non-transitory computer-readable storage medium for storing data and/or software that is executable by processor 604, and/or any other medium which may be used to store information that may be accessed by processor 604 to control the operation of computing device 601.

Computing device 601 may further include a display 606, a network interface 608, an input device 610, and/or an output module 612. Display 606 may be any display device by means of which computing device 601 may output and/or display data (e.g., to play decoded video). Network interface 608 may be configured to connect to a network using any of the wired and wireless short range communication protocols described above, as well as a cellular data network, a satellite network, free space optical network and/or the Internet. Input device 610 may be a mouse, keyboard, touch screen, voice interface, and/or any or other hand-held controller or device or interface by means of which a user may interact with computing device 601. Output module 612 may be a bus, port, and/or other interfaces by means of which computing device 601 may connect to and/or output data to other devices and/or peripherals.

In one embodiment, computing device 601 is a data center or other control facility (e.g., configured to run a distributed computing system as described herein), and may communicate with a media playback device and other client devices. As described herein, system 600, and particularly computing device 601, may be used for video playback, running an application, encoding and decoding video data, providing feedback to a server, measuring perceptual quality, implementing models, and otherwise implementing steps in an adaptive bitrate ladder optimization method, as described herein. Various configurations of system 600 are envisioned, and various steps and/or functions of the processes described below may be shared among the various devices of system 600 or may be assigned to specific devices.

Figure 6B:
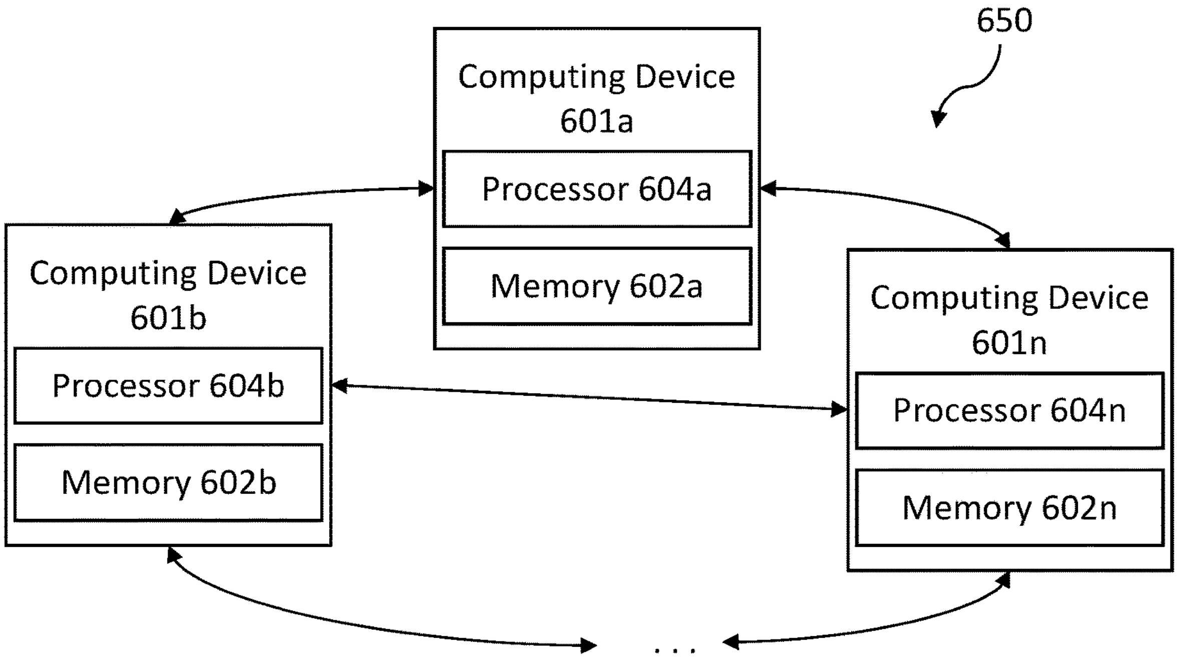
FIG. 6B is a simplified block diagram of an exemplary distributed computing system implemented by a plurality of computing devices, in accordance with one or more embodiments.

FIG. 6B is a simplified block diagram of an exemplary distributed computing system implemented by a plurality of computing devices, in accordance with one or more embodiments. System 650 may comprise two or more computing devices 601*a-n*. In some examples, each of 601*a-n* may comprise one or more of processors 604*a-n*, respectively, and one or more of memory 602*a-n*, respectively. Processors 604*a-n* may function similarly to processor 604 in FIG. 6A, as described above. Memory 602*a-n* may function similarly to memory 602 in FIG. 6A, as described above.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for optimizing a bitrate ladder for live streaming, the method comprising:

receiving, by an analytics server, a client-side input and an origin-side input during a first interval in a timeslot, the client-side input comprising a content delivery network (CDN) log from a client, the origin-side input comprising a quality measure from an origin server on an encoding side of a network, the origin server implementing an origin agent and a live encoder, wherein the timeslot comprises a duration selected to avoid a late reaction to network bandwidth fluctuation in a video player on a client side;

during the first interval, extracting from the CDN log a frequency of requests for each bitrate in a set of bitrates in the timeslot and a duration of a recent stall event for the client's player;

selecting, by the analytics server, during a second interval in the timeslot, an optimized bitrate ladder comprising an optimal set of bitrates (OSB) for a representation in a manifest using an optimization function, the optimization function taking as input the quality measure and a coefficient value, the coefficient value being determined by calling a stall analysis algorithm to which an average duration of stalls in each timeslot and a stall dictionary comprising a coefficient value for each range of stall is provided, the coefficient value being based on the frequency of requests and the duration of the recent stall event; and sending the optimized bitrate ladder to the origin server for live encoding a next segment.

2. The method of claim 1, further comprising selecting the coefficient value based on an average difference of quality and an average difference of bitrate.

3. The method of claim 2, wherein the coefficient value is selected to decrease one or both of the average difference of quality and the average difference of bitrate.

4. The method of claim 3, wherein the OSB comprises a new OSB when the binary variable comprises a True value.

5. The method of claim 3, wherein the OSB comprises a previously selected OSB when the binary variable comprises a False value.

6. The method of claim 1, wherein calling the stall analysis algorithm further results in determining a binary variable based on a threshold mean stall duration.

7. The method of claim 1, wherein the CDN log comprises a URL of a HTTP request message, the duration of the recent stall event included in the URL in common media client data (CMCD) format.

8. The method of claim 1, wherein the quality measure comprises a measure of quality of a previously encoded segment.

9. The method of claim 1, wherein the quality measure comprises one or both of a video multi-method assessment fusion (VMAF) and peak signal-to-noise ratio (PSNR).

10. The method of claim 1, wherein the origin server is configured to perform the live encoding of the next segment.

11. The method of claim 1, further comprising storing a tuple for each client that experienced a stall event, the tuple comprising a unique player identifier, a stall start time, and a stall end time.

12. The method of claim 1, further comprising storing a number of requests received from a given client for each bitrate in the set of bitrates.

13. The method of claim 1, wherein selecting the optimized bitrate ladder by the analytics server comprises techniques involving a mixed-integer linear programming (MILP) model including a multi-objective optimization (MOO) function.

14. The method of claim 1, further comprising:

receiving a HTTP request from the client, the request comprising a selected segment and a requested bitrate; and providing the selected segment at the requested bitrate wherein the requested bitrate is included in the OSB or at a lower bitrate wherein the requested bitrate is not included in the OSB.

15. The system of claim 14, wherein the client stall event information is stored in tuples comprising a unique player identifier, a stall start time, and a stall end time.

16. The method of claim 1, wherein the origin agent comprises a plug-in at the origin server to measure perceptual quality.

17. A distributed computing system comprising:

a database configured to store client stall event information and bitrates; and one or more processors configured to:

receive, by an analytics server, a client-side input and an origin-side input during a first interval in a timeslot, the client-side input comprising a CDN log from a client, the origin-side input comprising a quality measure from an origin server on an encoding side of a network, the origin server implementing an origin agent and a live encoder, wherein the timeslot comprises a duration selected to avoid a late reaction to network bandwidth fluctuation on a client side;

during the first interval, extract from the CDN log a frequency of requests for each bitrate in a set of bitrates in the timeslot and a duration of a recent stall event for the client's player;

select, by the analytics server, during a second interval in the timeslot, an optimized bitrate ladder comprising an optimal set of bitrates (OSB) using an optimization function, the optimization function taking as input the quality measure and a coefficient value, the coefficient value being determined by calling a stall analysis algorithm to which an average duration of stalls in each timeslot and a stall dictionary comprising a coefficient value for each range of stall is provided, the coefficient value being based on the frequency of requests and the duration of the recent stall event; and send the optimized bitrate ladder to the origin server for live encoding a next segment.

18. A system for optimizing a bitrate ladder for live streaming, the system comprising:

a processor; and a memory comprising program instructions executable by the processor to cause the processor to implement:

an analytics server configured to receive a client request comprising stall event information and an origin server message from an origin server on an encoding side of a network, the origin server implementing a live encoder, the origin server message comprising a quality measure of a previously encoded segment, the analytics server further configured to select an optimal set of bitrates (OSB) using the stall event information and the quality measure during a timeslot comprising a duration selected to avoid a late reaction to network bandwidth fluctuation on a client side, the OSB being selected using an optimization function, the optimization function taking as input the quality measure and a coefficient value, the coefficient value being determined by calling a stall analysis algorithm to which an average duration of stalls in each timeslot and a stall dictionary comprising a coefficient value for each range of stall is provided, the quality measure during the timeslot being provided by the encoding side of the network; and an origin agent comprising a live encoder plug-in, the origin agent configured to measure perceptual quality of encoded segments and to request the encoder to adjust the bitrate ladder in accordance with the OSB selected by the analytics server.

19. The system of claim 18, wherein the analytics server selects the OSB according to a mixed-integer linear programming (MILP) model including a multi-objective optimization (MOO) function.

20. The system of claim 19, wherein the MILP model receives as input a set of quality measures, a set of received requests for each bitrate in a set of bitrates, and a coefficient value $\alpha$.

* * * * *